United States Patent
Flamini et al.

(10) Patent No.: US 12,250,148 B1
(45) Date of Patent: Mar. 11, 2025

(54) NETWORK DEVICE WITH PORT AGGREGATION FOR FORWARDING NETWORK TRAFFIC

(71) Applicant: Amazon Technologies, Inc., Seattle, WA (US)

(72) Inventors: David Alonso Flamini, Dublin (IE); Thomas Shine, Dublin (IE); Lincoln Travis Dale, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/958,062

(22) Filed: Sep. 30, 2022

(51) Int. Cl.
*H04L 45/7453* (2022.01)
*H04L 45/023* (2022.01)
*H04L 45/24* (2022.01)

(52) U.S. Cl.
CPC ........ *H04L 45/7453* (2013.01); *H04L 45/023* (2013.01); *H04L 45/24* (2013.01)

(58) Field of Classification Search
CPC .... H04L 45/7453; H04L 45/023; H04L 45/24
See application file for complete search history.

(56) References Cited

U.S. PATENT DOCUMENTS

| | | | |
|---|---|---|---|
| 11,070,472 B1* | 7/2021 | Maharia | H04L 45/7453 |
| 2021/0211351 A1* | 7/2021 | Lin | H04L 41/0803 |

* cited by examiner

*Primary Examiner* — Cheikh T Ndiaye
(74) *Attorney, Agent, or Firm* — Klarquist Sparkman, LLP

(57) ABSTRACT

In a network device, unidirectional port aggregation can be used by aggregating corresponding ports that represent a single underlay next hop. A common layer 2 address (e.g., Media Access Control (MAC) address) can be shared across aggregated destination network devices to allow these network devices to accept traffic forwarded over the unidirectional multi-destination bond port. Port aggregations (e.g., "bonds", "trunks", etc.) are controlled by dynamic route updates propagating through a network of devices. Dynamic route updates can be implemented as part of routing protocols. The route updates can be interpreted by the network switches as including a port aggregation signal. Policy may be applied to these route updates to adjust the behavior of the port aggregation mechanism. The resulting port aggregation is installed in the forwarding table of network devices so that the corresponding prefixes resolve to the underlay next hop representing the aggregated port.

19 Claims, 8 Drawing Sheets

US 12,250,148 B1

NETWORK DEVICE WITH PORT AGGREGATION FOR FORWARDING NETWORK TRAFFIC

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses (including prefixes), error detection codes, packet sequencing identification, and the like. Typically, control information is found in packet headers and trailers included within the packet and adjacent to the payload data.

Generally, network switches have two primary planes: a management plane and a data plane. The management plane configures the data plane, which can include an Application Specific Integrated Circuit (ASIC). The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. Peer routers transmit new routes to neighbor network switches as part of a shared protocol, such as the Border Gateway Protocol (BGP). The new routes can be updated in the forwarding tables of the receiving network switches.

Forwarding pipelines using tunneling in ECMP may require duplication of egress objects even when prefixes resolve to a same underlying next hop. Such duplication impacts the efficiency of the network switches and unnecessary wastes resources. Ultimately, the switches require larger memories to accommodate the waste, which is expensive. Greater efficiency is needed for programming of network switches.

DETAILED DESCRIPTION

Networking routers that use additional tunneling headers require duplication of egress objects across unique ECMP groups even when prefixes ultimately resolve to the same underlying next hops. Such a scenario depletes ECMP resources, thereby, hindering network scalability. Unidirectional port aggregation can be used to replace an individual layer 3 underlay next hops by aggregating the corresponding ports into an outgoing "bond port" (which can be unidirectional) so that the ports are represented as a single underlay next hop. This can be done when a network device connects to another network device or when a network device connects to a number of other network devices (e.g., in a Clos fabric). A common layer 2 address (e.g., a Media Access Control (MAC) address) can be shared across aggregated destination network devices to allow these network devices to accept traffic forwarded over the unidirectional multi-destination bond port. Port aggregations (e.g., "bonds", "trunks", "Link Aggregation Group" (LAG), etc.) are controlled by dynamic route updates propagating through a network of devices. Dynamic route updates can be implemented as part of routing protocols. The route updates can be interpreted by the network switches as including a port aggregation signal. Policy may be applied to these route updates to adjust the behavior of the port aggregation mechanism. For example, a number of paths announced for a route across next hops may be used (via policy or by default) to determine which ports corresponding to such next hops should conform to a particular aggregation so that ports leading to next hops announcing the largest number of paths are selected and ports leading to next hops announcing the least number of paths are rejected. In general, any route attributes, local or otherwise, including the existence of such route, their metrics, etc., may be matched on, transformed, and applied as port aggregation via policy. The resulting port aggregation is installed in the forwarding table of network devices so that the corresponding prefixes resolve to the underlay next hop representing the aggregated port.

Figure 1:
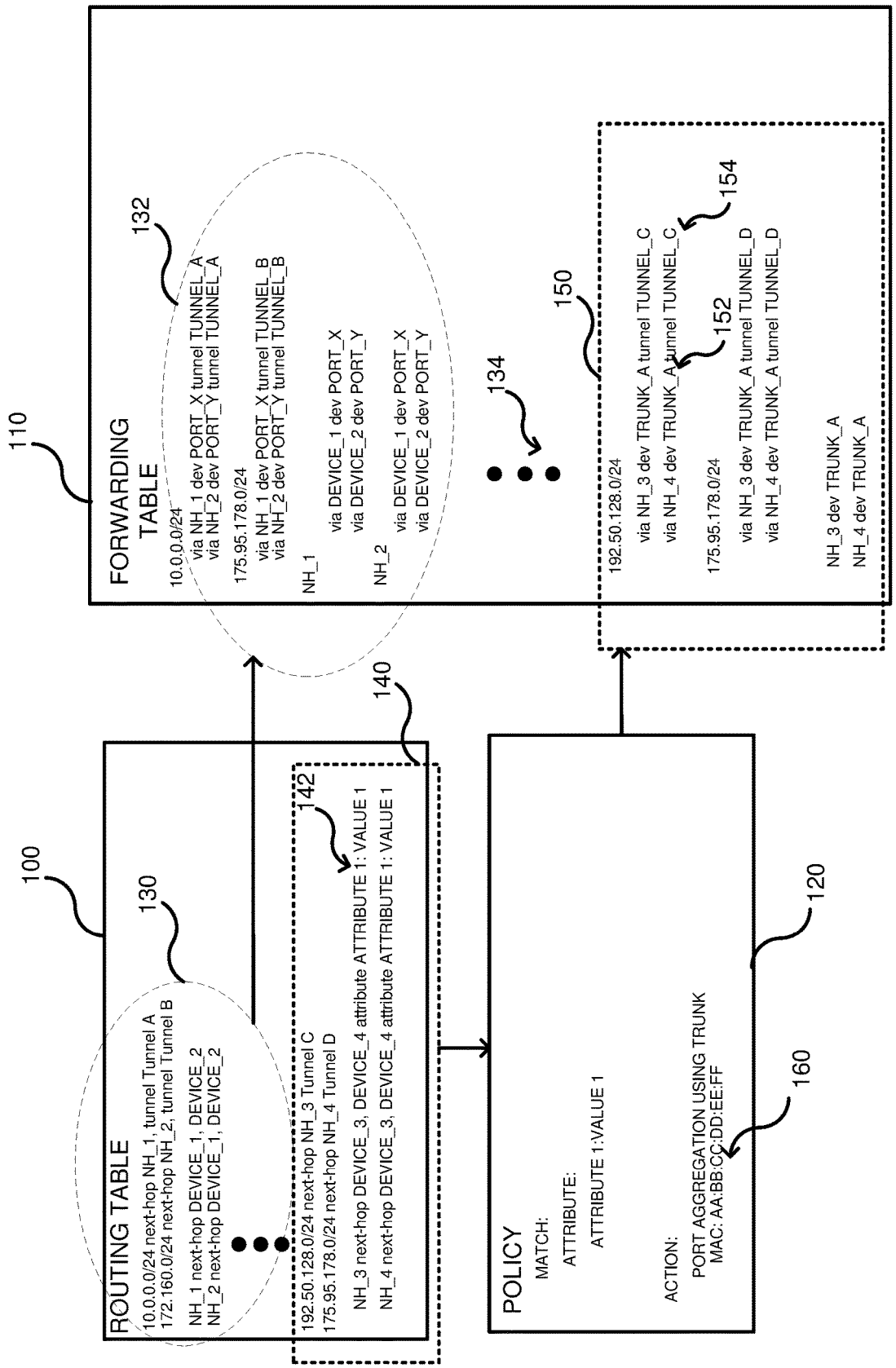
FIG. 1 shows a routing table and a corresponding conversion to a forwarding table using a policy to aggregate ports in a network device.
Figure 4:
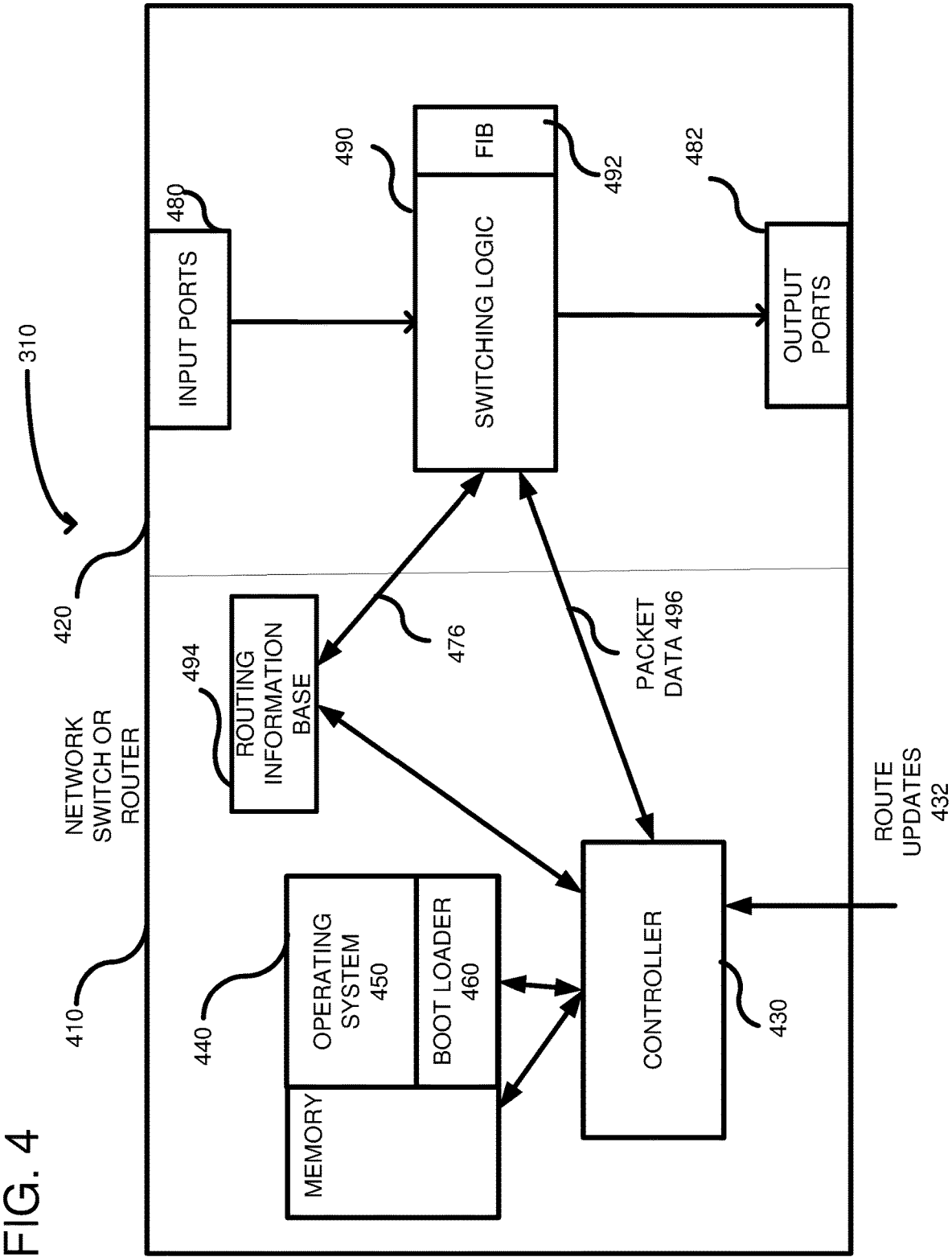
FIG. 4 shows an embodiment of a network router or switch including a forwarding table programmed in accordance with FIGS. 1 and 2.

FIG. 1 shows an example routing table 100 and corresponding conversion to a forwarding table 110 using a policy statement 120. The routing table 100 and forwarding table can be within a network device, such as is shown in FIG. 4, and described further below. The routing table 100 can include different types of routing information that are resolved in different ways. For example, a first type of routing information 130 includes next hop information associated with multiple prefixes. For example, prefix 10.0.0.0/24 is shown having a next hop NH_1. Additionally, the prefix 10.0.0.0/24 is associated with a Tunnel A. A second prefix 172.160.0/24 is also shown as an example including its association with Tunnel B. Resolution of the routing information 130 is shown in the forwarding table 110 at 132. Specific ports (i.e., port X and port Y) are associated with the prefixes. Although only two prefixes are shown, generally, there a large number of entries in the forwarding table 110, as indicated by repeating dots 134. A second type of routing information 140 is also included in the routing table 100. The second type of routing information 140 includes one or more attributes 142, shown at "Attribute 1" having a value of "Value 1". Notably, the first type of routing information 130 does not include the attributes 142. The attributes can be received in a networking device using BGP updates (other protocols can be used) to dynamically aggregate ports, as further described below. The networking device can match on the attribute 142 using the policy 120. For updates containing matching attributes, the policy 120 can resolve the forwarding table 110 using port aggregation. For example, the resolution of the second type of routing information 140 is shown at 150 in the forwarding table 110. Specifically, multiple prefixes are assigned to a same trunk (e.g., Trunk A). For example, prefix 192.50.128.0/24 and prefix 175.95.128.0/24 both are associated with Trunk A, as shown at 152. Additional tunnel information can also be included, as shown at 154. Thus, instead of resolving to ports in the forwarding table, as is shown at 132 for prefixes 10.0.0.0/24 and 175.95.178.0/24, the prefixes 192.50.128.0/24 and 175.95.178.0/24 resolve to a common trunk, which aggregates multiple ports.

Additionally, as shown at 160, the policy can include a MAC address to be used for the prefixes having the matching attribute 142. The shared MAC address can be statically configured on DEVICE_3 and DEVICE_4 (see FIG. 3) and then selected via policy configuration on DEVICE_0, but it can also be statically configured on DEVICE_0 (with also configuring DEVICE_3 and DEVICE_4). Alternatively, the shared MAC address may be signaled in complete or partial form via standard route attributes (e.g., 48 bits of a MAC address encoded in the value field of a BGP extended community). If signaled, DEVICE_0 can determine the shared MAC address by reading the corresponding standard route attribute(s) by matching on them via policy (e.g., using type/sub-type of a BGP extended community). No additional layer 2 or layer 3 signaling mechanism is needed between DEVICE_3 and DEVICE_4 or between DEVICE_0 and DEVICE_3 and DEVICE_4 (as opposed to, e.g., multi-chassis link aggregation—MC-LAG).

Figure 2:
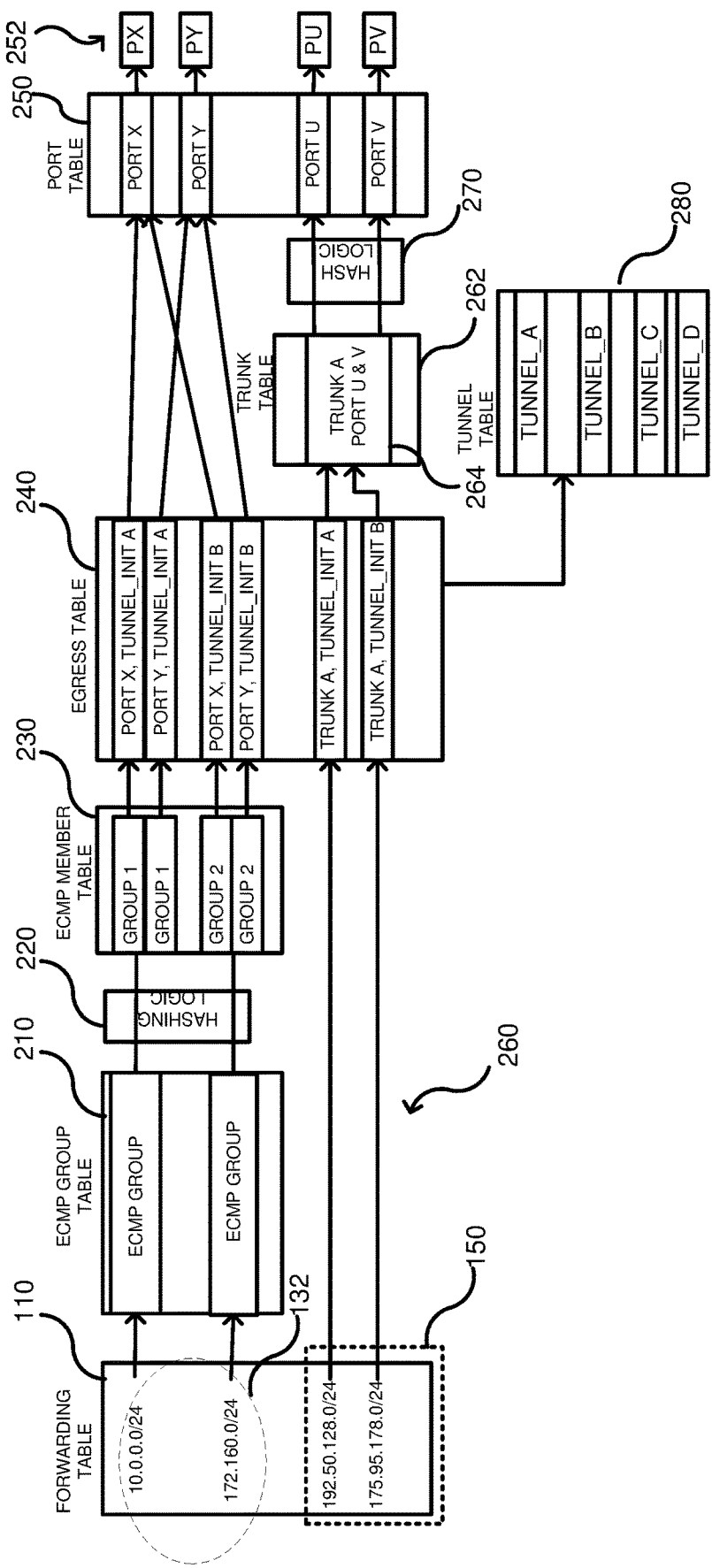
FIG. 2 shows how the forwarding table is used to route packets through the network device.

FIG. 2 shows the forwarding table 110 and how the first type of routing information 132 determines an output port as compared to the second type of routing information 150. Overall, FIG. 2 shows a series of logical steps used in making a forwarding decision. Such an implementation can be located within switching logic shown and described in FIG. 4. As to the first type of routing information 132, the forwarding table entry for the prefix 10.0.0.0/24 points to an entry in an ECMP group table 210. The output of the entry of the ECMP group table can pass through hashing logic 220 before pointing at an entry in an ECMP member table 230. The output of the ECMP member table 230 can then point to an egress table 240 (also called a next-hop table), which then points to a port table 250. In turn, the port table 250 points to the output ports 252 upon which the packets can be transmitted. A tunneling header can be added to a packet in conformance with the tunnel table 280.

By contrast, the second type of routing information 150 includes trunk information 152 (FIG. 1) in the forwarding table 110. As a result, as shown by arrows 260, the ECMP group table 210, the hashing logic 220 and the ECMP member table 240 can be bypassed. Instead, the forwarding table 110 points directly to an entry in the egress table 240, which, in turn, points to a trunk table 262. The trunk table 262 is also called a LAG table. The trunk table includes a single entry 264 that aggregates multiple ports, such as ports U and V in this example. Hashing logic 270, coupled to an output of the trunk table, performs load balancing to select port U or port V. The tunnel table 280 can be used in conjunction with the egress table 240 to append a tunnel header to the outgoing packet. Thus, the second type of routing saves memory space due to the not using of the ECMP group table 210 and the ECMP member table 230.

Additionally, the hashing logic 270 is coupled to an output of the egress table 240, whereas the hashing logic 220, for the first type, is before the egress table 240. It should be noted that although different ports are shown for ports X. Y and ports U, V, these can all be a same port. For example, port U can be the same as port X and port V can be the same as port Y. Although hashing logic 220 and 270 are shown separately, they can be the same logic.

Figure 3:
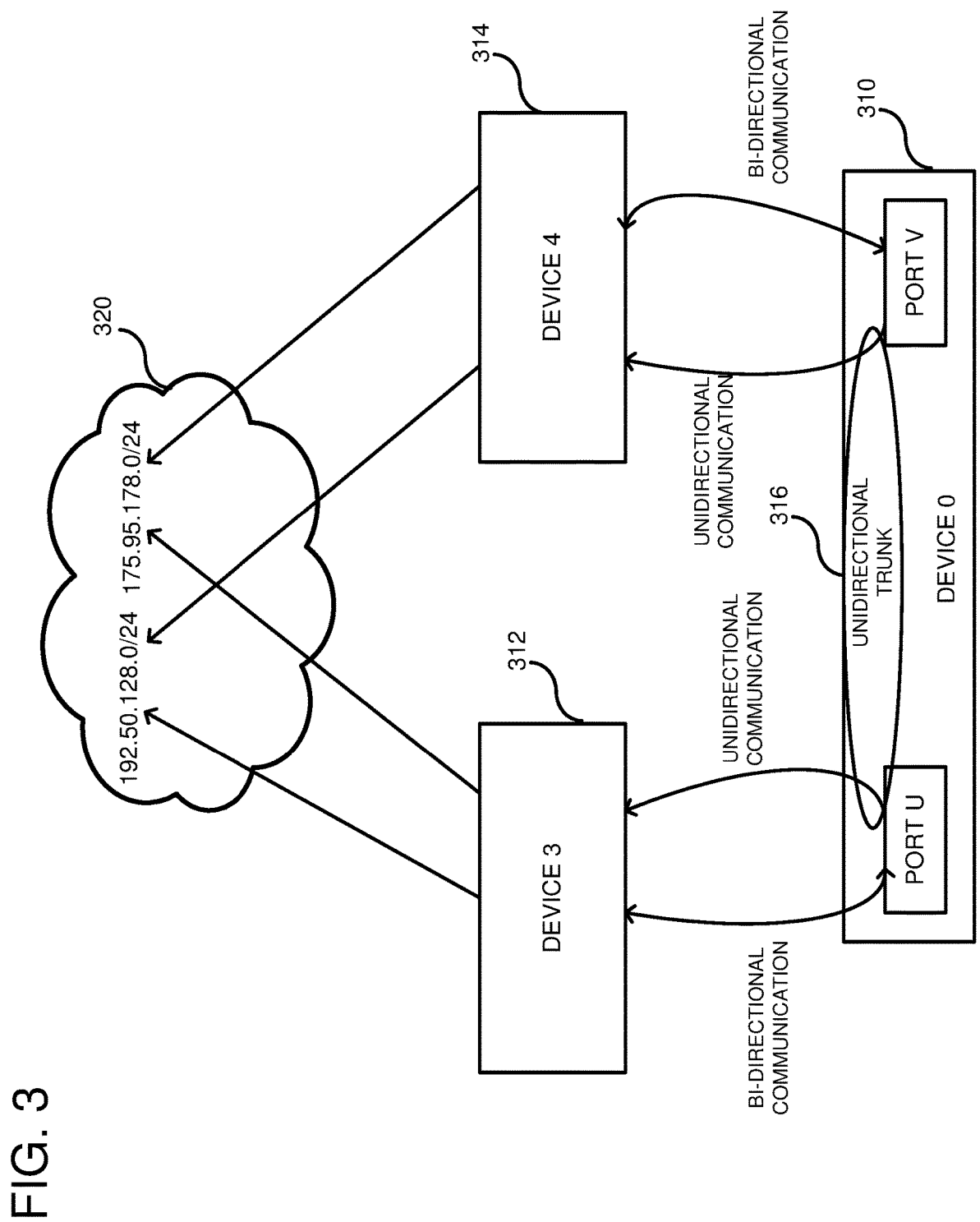
FIG. 3 shows a network diagram of how multiple prefixes can be routed using a unidirectional trunk.

FIG. 3 is network diagram showing ports U and V within a network device 0, shown at 310. FIG. 3 further shows how packets having the prefixes 150 from FIG. 2 can be routed through either port U or V to reach the desired destination. Next hop network devices 3 and 4 are shown at 312, 314, respectively. The trunk table entry creates a unidirectional trunk represented at 316 for unidirectional communication to network devices 312, 314. The ports U and V can also receive back bi-directional communications from the network devices 312, 314. Both next hops 312, 314 can have a same MAC address and can both be used for forwarding packets to the prefixes shown generically in a network 320. The shared MAC address can be statically configured on devices 312, 314 and then selected via policy configuration on DEVICE_0 310 (see policy document 120 at 160, for example). Alternatively, the shared MAC address may be signaled in complete or partial form via standard route attributes (e.g., 48 bits of a MAC address encoded in the value field of a BGP extended community). If signaled, DEVICE_0 can determine the shared MAC address by reading the corresponding standard route attribute(s) and by matching on them via policy (e.g., using type/sub-type of a BGP extended community). No additional layer 2 or layer 3 signaling mechanism is required between DEVICE_3 and DEVICE_4 or between DEVICE_0 and DEVICE_3 and DEVICE_4.

FIG. 4 is a first embodiment of a network device 310 (e.g., router or switch) that is used for forwarding packets to neighbor network devices. The network device 310 includes a management side 410 and a switching side 420 (also called the data plane). The management side 410 is generally a management layer for configuring, updating, and controlling the switching side 420. The control side includes a controller 430, which can be a Central Processing Unit (CPU), processor, application-specific integrated circuit (ASIC), microcontroller, or any hardware logic that can receive packets and provide switch management and control in response thereto. The controller 430 has access to a memory 440 that can be a Dynamic Random Access Memory (DRAM), Flash memory, or other type of RAM or ROM. The memory 440 is used to store an operating system 450 for the network device 400. The memory 440 may also include a boot loader program 460, which is a first program executed after a reboot of the controller 430, and which can run basic hardware tests before booting up the operating system 450. Although a single memory is shown, the memory 440 can be divided into multiple memories and even memories of different types. A communications bus 476 allows communications between a RIB 494 and the switching side 420. The communications bus 476 can be any desired bus type, such as PCI, PCIe, AGP, etc. The switching side 420 includes input port 480 and output port 482 used for receiving and sending network packets, respectively. Switching logic 490 is positioned intermediate the input and output ports. A FIB 492 is a forwarding table that can be programmed by the control side 410 and describes next hops for identified prefixes. Thus, routing information in terms of a next hop for a prefix is made by the switching logic 490 using the FIB.

The controller 430 can use one or more RIBs 494 to generate information needed to program the FIB 492. Different routing protocols such as BGP, IS-IS, OSPF, as well as static routes can be merged together to generate the RIB 494. Generally, the routes programmed in the RIB are received by the controller 430 by route updates 432, which can include the attribute 142 from FIG. 1. The RIB 494 can then be programmed into the FIB 492. Once operational, the switching logic 490 can begin transmitting packets from the input port 480 to the output port 482. Although not shown, the switching logic 490 can include an Application Specific Integrated Circuit (ASIC). More specifically, the switching logic 490 can include multiple different hardware logic blocks including a Layer 2 hardware block, a Layer 3 hardware block, and an ACL hardware block. The layer 2 hardware block relates to an Ethernet layer and can forward packets based on MAC tables. The layer 3 hardware block relates to forwarding based on a prefix match of an IP address. The ACL block relates to permissions and can include rules whether to drop packets. The different hardware blocks can be coupled in series and additional hardware blocks can be added based on the design. Packets pass from the input port 480 to the output port 482 in accordance with the configuration of the layer 2 and 3 hardware logic blocks. Although only a single input and output port are shown, typically the ASIC controls multiple ports. Additionally, although not shown, interfaces are located in the input and output ports. Typically, each switch controls multiple interfaces used for forwarding traffic to next hops.

The network device 400 is described as a router or switch. However, the network device can include switches (multi-layer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data.

Figure 5:
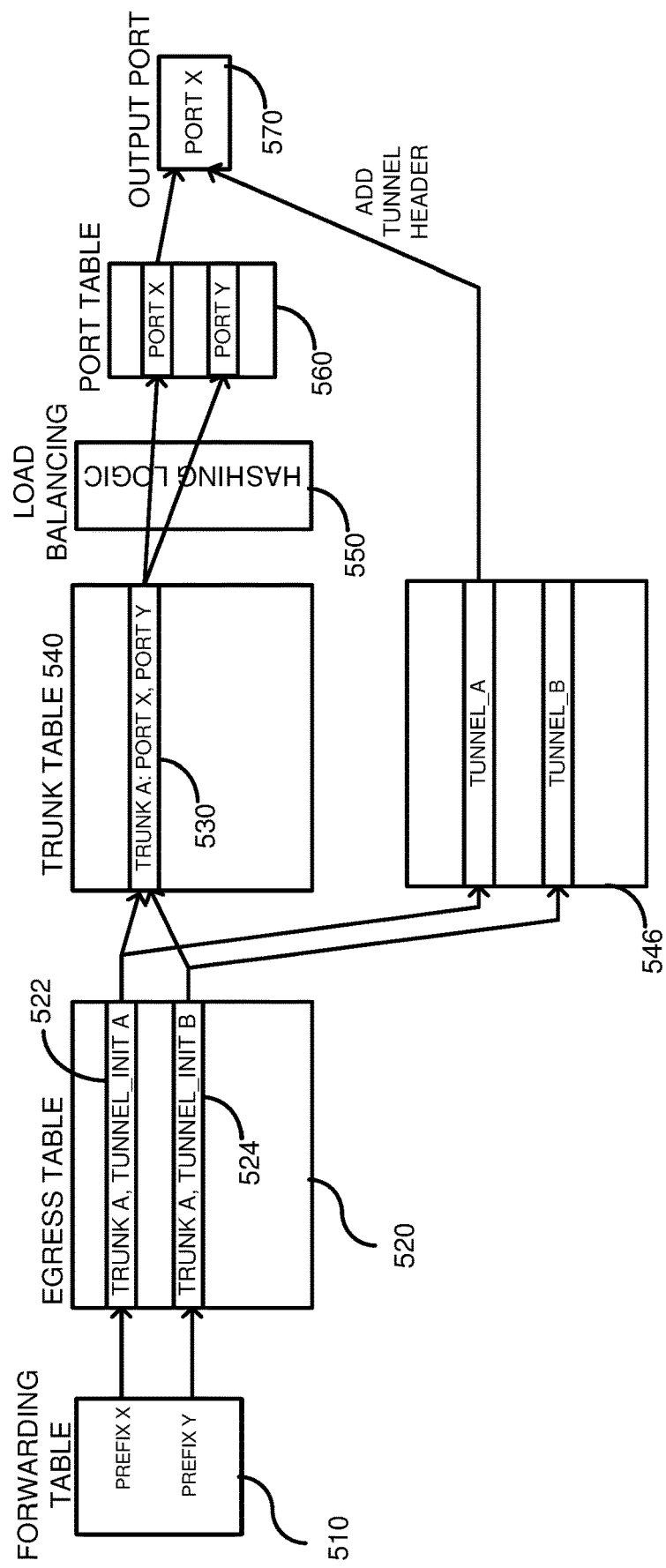
FIG. 5 shows another example of how the forwarding table is used to route packets through a network device.

FIG. 5 is another example showing two prefixes X. Y in a forwarding table 510. The forwarding table points directly to an egress table 520, wherein each prefix is associated with one entry, shown at 522, 524. However, each entry 522, 524 points to a same trunk entry 530 in a trunk table 540. The trunk entry 530 identifies two separate ports, Port X and Port Y, either of which is valid for forwarding packets. Thus, the trunk table 540 functions as a port aggregation. The entries 522, 524 also identify tunnels that can be used in a tunnel table 546. Hashing logic 550 chooses between ports X and Y for purposes of load balancing and outputs the packet to the selected output port, which in this case is shown as port X 570. The tunnel header from the tunnel table 546 can also be added to the packet before transmission over port X 570.

Figure 6:
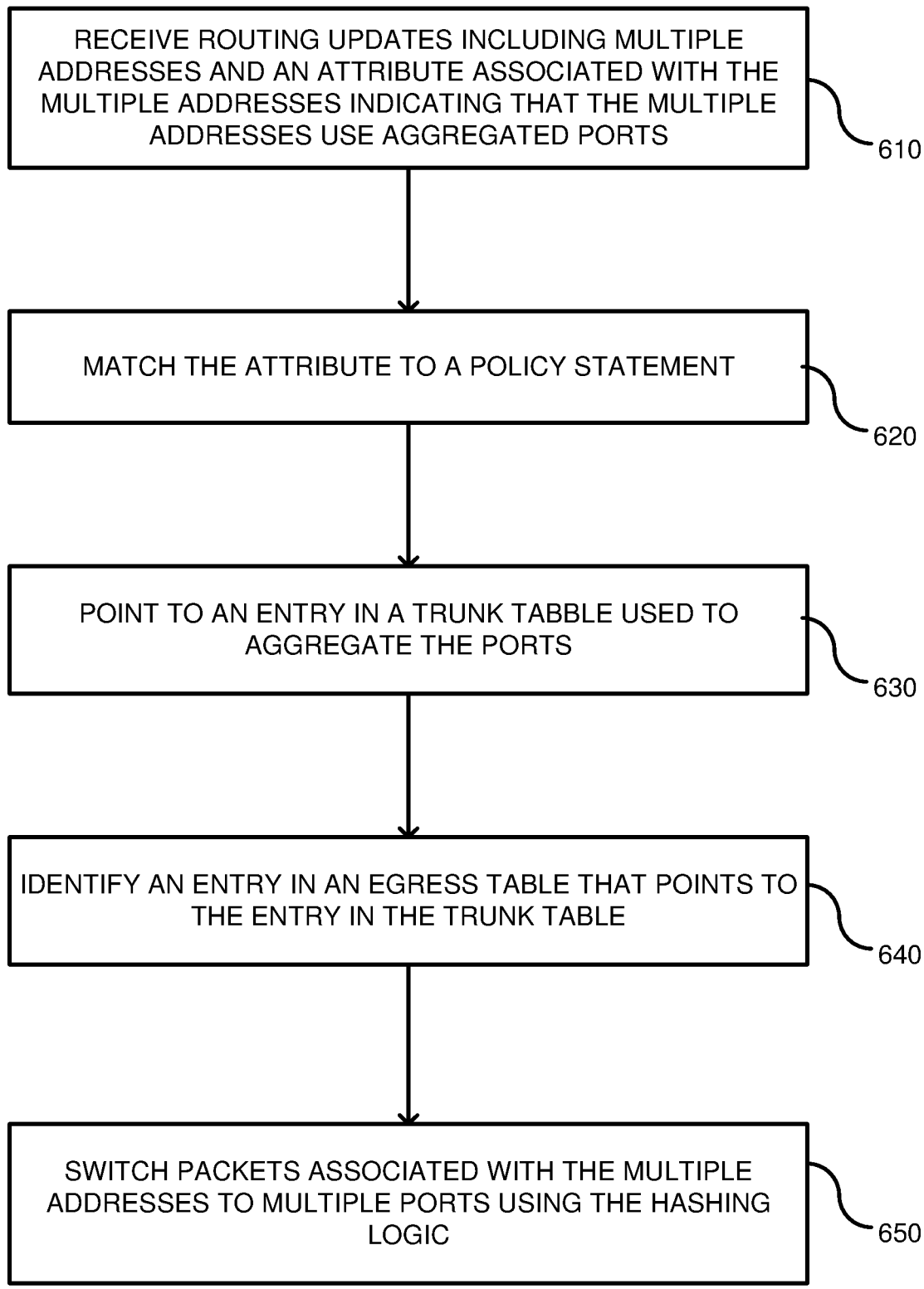
FIG. 6 is a flowchart according to an embodiment of a method for forwarding network traffic through a network device.

FIG. 6 is a flowchart according to one embodiment of a method for forwarding network traffic through a network device. In process block 610, routing updates are received including multiple addresses and an attribute associated with the multiple addresses. The attribute can be used to indicate aggregated ports. For example, in FIG. 1, the attribute 142 can be used to indicate that the prefixes within box 140 have an aggregated port. As a further example, in FIG. 5, despite that the port table 560 has two ports (X and Y), the trunk table 540 has a single entry 530 used to aggregate the ports. In process block 620, the attribute is matched against a policy statement. For example, in FIG. 1, the policy 120 can include attribute values and a comparison can be made to determine if the attributes within the policy 120 match the attributes received in the updates, such as the updates shown in box 140. In process block 630, an entry in a trunk table is pointed to for multiple aggregated ports. For example, in FIG. 2, the trunk table 262 has multiple ports U, V associated with a single entry 264. In process block 640, an entry in the egress table is identified that points to the entry in the trunk table. For example, in FIG. 5, for the corresponding prefix, an entry within the egress table 520 is identified that points to the entry 530 in the trunk table 540. Finally, in process block 650, packets are switched using multiple ports and hashing logic to select the ports. For example, in FIG. 5, the hashing logic 550 can be used to load balance and select one of the ports in the port table 560.

Figure 7:
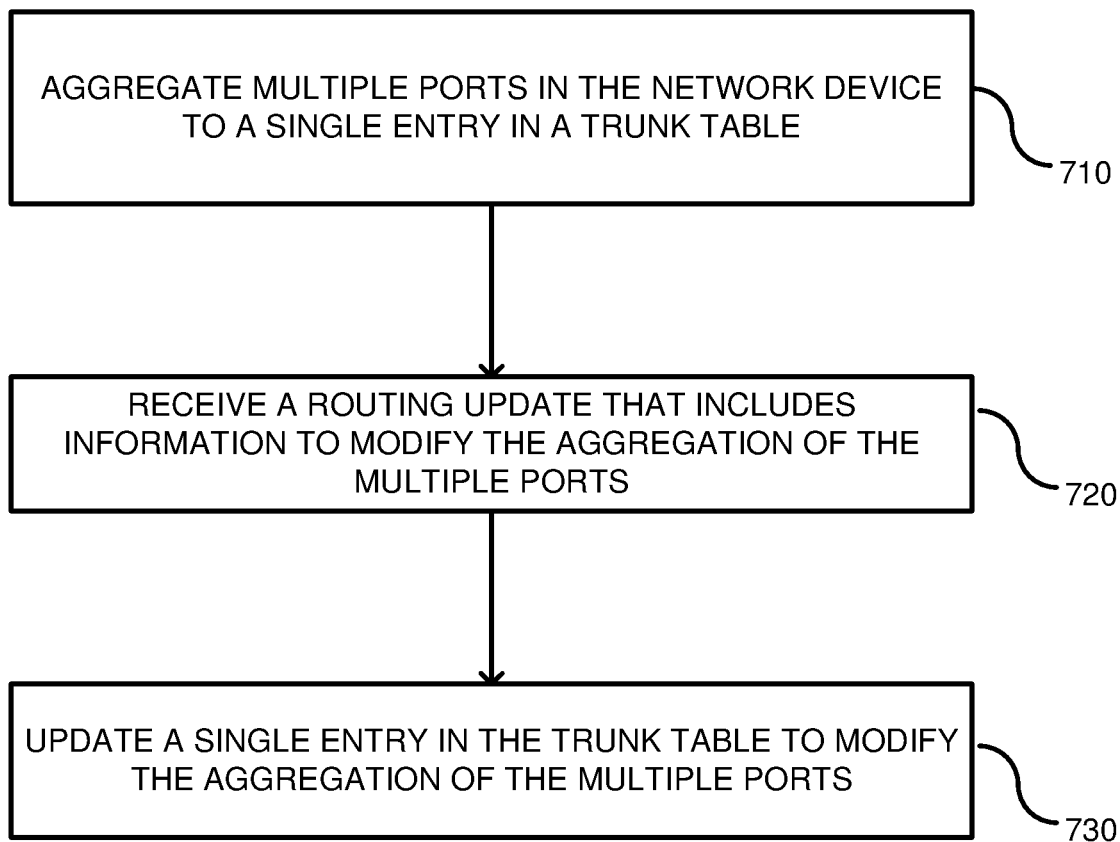
FIG. 7 is a flowchart according to another embodiment of a method for forwarding network traffic through a network device.

FIG. 7 is a flowchart according to another embodiment for forwarding of network traffic. In process block 710, multiple ports in a network device are aggregated to a single entry in a trunk table. For example, in FIG. 5, the ports X and Y from the port table 560 are aggregated to a single trunk table entry 530. Thus, a packet can be forwarded to either port X or Y in accordance with the trunk table entry depending upon the hashing logic 550. In process block 720, a routing update is received that includes information to modify the aggregation of multiple ports. Thus, an update, such as a BGP update, can be received by the network device. As shown in FIG. 1, the update can include an attribute 142 and the attribute can be used to identify a port aggregation associated with a prefix (an address). In some cases, the attribute can be compared against a policy 120 and the policy controls the port aggregation. In process block 730, a single entry in the trunk table is updated to modify the aggregation of the multiple ports. For example, in FIG. 5, the trunk table entry 530 can be modified based upon the routing update. In this case, the routing update aggregated ports X and Y. As a result, multiple ports are aggregated through a single trunk table entry. Memory can be saved, such as by avoidance of using ECMP group tables and ECMP member tables (FIG. 2).

Figure 8:
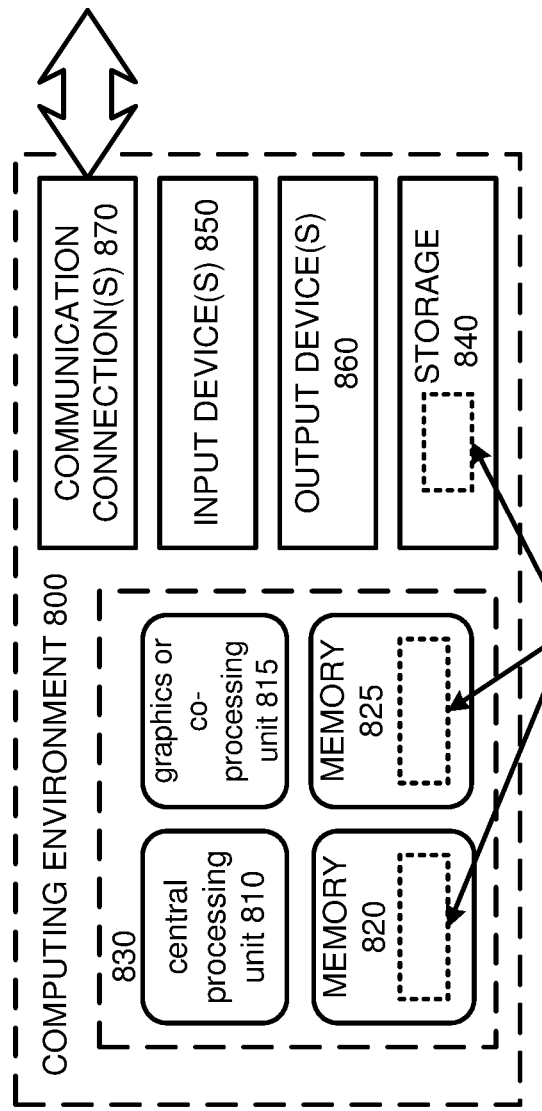
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of forwarding network traffic through a network device, comprising:

receiving one or more routing updates in the network device, wherein the one or more routing updates include multiple Internet Protocol (IP) addresses and an attribute associated with the multiple IP addresses indicating that the multiple IP addresses are to use aggregated ports on the network device;

matching the attribute to a policy statement used to generate a forwarding table;

generating the forwarding table using the policy statement, wherein the forwarding table is used to switch network traffic to ports in the network device based upon the IP addresses;

for the multiple IP addresses, using the forwarding table to point to an entry in a trunk table, wherein the trunk table aggregates the ports on the network device;

for packets received in the network device addressed to any of the multiple IP addresses, identifying an entry in an egress table that points to the entry in the trunk table; using the entry in the trunk table to identify the ports; and switching packets addressed to the multiple IP addresses to the multiple ports using hashing logic.

2. The method of claim 1, wherein the switching of the packets includes using a same Media Access Control (MAC) address for forwarding packets addressed to the multiple IP addresses.

3. The method of claim 1, wherein the hashing logic is first hashing logic and wherein packets received in the network device that have the attribute matching the policy are switched using the first hashing logic after the egress table and wherein packets not having the attribute matching the policy are switched using second hashing logic before the egress table.

4. The method of claim 1, further including encapsulating the switched packets using tunnel information found in the egress table.

5. The method of claim 1, wherein the entry in the trunk table is dynamically modifiable through receiving additional routing updates.

6. A method of forwarding network traffic through a network device, comprising:
aggregating multiple ports in the network device to a single entry in a trunk table;
receiving a routing update in the network device, wherein the routing update includes information to modify the aggregation of the multiple ports wherein the information in the routing update includes at least one attribute that matches an attribute in a policy;
generating a forwarding table in the network device by searching for the information in the policy, matching on the information, and extracting a trunk identifier associated with the information from the policy; and
updating the single entry in the trunk table using the trunk identifier to modify the aggregation of the multiple ports in the forwarding table of the network device in accordance with the routing update.

7. The method of claim 6, further including switching network packets for multiple Internet Protocol (IP) addresses using the single entry in the trunk table.

8. The method of claim 6, further including using a same Media Access Control (MAC) address for first and second packets associated with the single entry in the trunk table, wherein the first packet has a different destination Internet Protocol (IP) address than the second packet.

9. The method of claim 6, wherein the updating of the forwarding table in the network device includes pointing to an entry in the trunk table instead of an entry in an Equal-Cost Multi-path (ECMP) group table.

10. The method of claim 6, wherein first hashing logic coupled to an output of an egress table is used for packets having an Internet Protocol (IP) address switched through the aggregated multiple ports and second hashing logic coupled to an input to the egress table is used for packets having an IP address switched through ports that are not aggregated.

11. The method of claim 6, wherein the network device is a network switch or a router.

12. The method of claim 6, further including switching packets using the trunk table and encapsulating the switched packets using tunnel information found in an egress table.

13. The method of claim 6, wherein the routing update is a Border Gateway Protocol (BGP) update.

14. A network device comprising a processor and a memory having computer-executable instructions that, when executed, cause the network device to perform a method, the method comprising:
receiving a route update in the network device;
detecting an attribute within the update that matches a policy attribute in a policy;
determining a trunk aggregation based upon the policy attribute; and
generating a forwarding table by inserting the route update into the forwarding table of the network device including the trunk aggregation of multiple ports.

15. The network device of claim 14, the method further including switching multiple prefixes using a same trunk entry in a trunk table.

16. The network device of claim 15, wherein the switching occurs without using an Equal-Cost Multi-path (ECMP) group table or an ECMP member table.

17. The network device of claim 15, wherein the multiple prefixes use a same destination Media Access Control (MAC) address.

18. The network device of claim 14, the method further including encapsulating a switched packet using tunnel information identified in the forwarding table.

19. The network device of claim 14, the method further including inserting port information in the forwarding table if the attribute is not within the update, and inserting trunk information in the forwarding table if the attribute is within the update.

* * * * *